United States Patent [19]
Shannon

[11] 3,923,674
[45] Dec. 2, 1975

[54] THERMAL INSULATION MATERIALS AND METHODS OF MAKING SAME

[75] Inventor: Richard F. Shannon, Lancaster, Ohio

[73] Assignee: Owens-Corning Fiberglas Corporation, Toledo, Ohio

[22] Filed: Jan. 2, 1970

[21] Appl. No.: 493

Related U.S. Application Data

[63] Continuation of Ser. No. 739,895, June 9, 1968, abandoned, which is a continuation of Ser. No. 502,570, Oct. 22, 1965, abandoned, which is a continuation of Ser. No. 285,601, June 5, 1963, abandoned.

[52] U.S. Cl. .................. 252/62; 106/14; 106/74; 106/78; 252/387; 252/389 R
[51] Int. Cl.² ........................................ C23F 11/18
[58] Field of Search ........ 252/62, 387, 389; 106/14, 106/74, 77, 78

[56] References Cited
UNITED STATES PATENTS

| | | | |
|---|---|---|---|
| 2,462,538 | 2/1949 | Nagel | 106/78 |
| 2,586,726 | 2/1952 | Schuetz et al. | 162/53 |
| 2,904,444 | 9/1959 | Hoopes et al. | 106/78 |
| 3,009,872 | 11/1961 | Snell et al. | 210/29 |
| 3,095,312 | 6/1963 | Holmes | 106/75 |

OTHER PUBLICATIONS

Chemical Abstracts, American Chemical Society, Vol. 54, 1960, p. 15195g.

Primary Examiner—Benjamin R. Padgett
Assistant Examiner—Irwin Gluck
Attorney, Agent, or Firm—Carl G. Staelin; John W. Overman; William P. Hickey

[57] ABSTRACT

A strong light weight insulation material having a calcium silicate binder and which inhibits corrosion of stainless steel. The insulation material is substantially devoid of the usual soluble chloride impurities, and includes from 1 to approximately 15 percent of sodium or potassium silicate, and preferably has no more than 1000 parts of chloride ion in 1 million parts of the insulation material.

The disclosure also teaches a method of forming the insulation wherein a slurry substantially devoid of soluble silicates is molded into a desired shape. A solution of sodium silicate is then filtered through the shape following which formation of the calcium silicate binder is completed.

5 Claims, No Drawings

THERMAL INSULATION MATERIALS AND METHODS OF MAKING SAME

The present application is a continuing application of co-pending application Ser. No. 739,895 filed June 9, 1968, now abandoned, which in turn was a continuing application of my then co-pending application Ser. No. 502,570, filed Oct. 22, 1965, and now abandoned, which in turn was a continuing application of my then co-pending application Ser. No. 285,601, filed June 5, 1963, and now abandoned.

The present invention relates in its general aspects to improved thermal insulation materials, including improved methods of making same. More specifically, the present invention has particulary significant relationship to the preparation of improved thermal insulation materials of the porous alkaline earth metal silicate variety such as are utilized extensively as exterior surface insulation for steam pipes, boilers, autoclaves, and reaction kettles, as well as component flanges, valves and miscellaneous fittings employed in conjunction with the same. Such thermal insulation materials also have widespread application as surface insulation for other types of metallic structural members such as heated ducts, furnaces, machinery and building members, as well as other high temperature applications where a low K-factor insulation is desired. Although such insulation materials of the alkaline earth metal silicate variety are most prevalently utilized as high temperature thermal insulation, extremely advantageous results attend the use thereof in low temperature installations, as well.

According to conventional methods of manufacture of thermal insulation materials of the alkaline earth metal silicate variety, the constituents from which the insulation material is prepared are initially dispersed in an aqueous medium and thereafter molded or shaped to conform to a predetermined size and configuration during the processing thereof. Of course, the particular size or configuration of the insulation material depends in large measure upon its intended ultimate use, since the insulation material is ordinarily molded or shaped to conform closely to the surface configuration of the member upon which it is ordinarily directly applied. Frequently, the insulation material is molded as a tubular half-section so that a pair of such half-sections may be mated edgewise around steam pipes and the like. However, these thermal insulation materials are also commonly available as preformed blocks and slabs for use on flat or large diameter surfaces. Regardless of the nature of the ultimate use, however, the various types of alkaline earth metal silicate insulation materials are particularly desirable as shaped structural insulation, since they are ordinarily processed into composite porous bodies of material having an integrated and interlocking complex of alkaline earth metal and silicate crystals which contribute substantial structural strength to the body of the material. Additional attributes of such alkaline earth metal silicate insulation materials reside in the very low K-factor and fire-proof characteristics which they possess even at temperatures ranging upwards of eight hundred degrees Fahrenheit to, and in some instances above, eighteen hundred degrees Fahrenheit, depending upon the particular alkaline earth metal silicate composition and product density utilized.

One commonly-known method heretofore utilized extensively in the commercial production of alkaline earth metal silicate insulation materials of the calcium-silicate variety involves the use of finely comminuted and reactive proportions of calcareous and siliceous materials which are thoroughly and homogeneously dispersed in an aqueous medium to form a slurry or aqueous suspension thereof. Frequently, substantial amounts of fibrous materials, such as fibers of chrysotile and amosite asbestos, bagasse, glass, or the like, are introduced in segregated form into the slurry to promote the suspension characteristics of the slurry and to impart additional internal coherence in the final product. The resultant slurry is then placed in a cavity-type mold having substantially the internal configurational and dimensional characteristics desired for the ultimate body of insulation material. The mold-contained slurry is thereafter subjected to processing conditions employing elevated temperatures and pressures, commonly supplied by the use of superatmospheric steam accompanied by sufficient pressure to prevent ebullition of the slurry. Such processing tends to effect a polymerization type of crystallization of the calcareous and siliceous constituents and an attendant in-situ conversion or transformation of the slurry into an indurated body of alkaline earth metal silicate insulation material having an integrated and microporous crystalline structure. Ordinarily, excess residual quantities of the uncombined aqueous medium which remain in the converted body of crystalline material after such processing may be removed by conventional drying techniques.

Another common method of forming shaped or molded alkaline earth metal silicate insulation material involves the use of filter-press techniques. According to such latter techniques, a slurry is prepared which may follow the same manner of slurry preparation as previously described. In contrast to the previously described method, however, the slurry is thereafter partially dewatered and shaped by placing the slurry in a filter-press mold or compression-mold where substantial proportions of the aqueous medium are removed by squeezing the aqueous medium from the slurry under pressure, which may be as high as several hundred pounds per square inch depending upon the nature of the ensuing procedures. In certain instances, extremely high pressures are desirable to mold the slurry constituents to the desired shape and dimensions and to impart sufficient self-supporting strength to permit removal and transfer of the partially dewatered slurry directly to a drying chamber, where it is dried to its final state. Alternatively, the self-supporting material may be removed and transferred from the filter-press or mold to a high temperature pressure chamber, such as a superatmospheric steam autoclave, where the compressed slurry constituents are further indurated, as with the previously described in-situ method, under the influence of elevated temperatures and pressures, and thereafter dried.

Regardless of which one of the foregoing methods is employed, however, it has been found that the slurry constituents, and particularly the aqueous medium, frequently contain or are sources of harmful quantities of chloride, which is either liberated in soluble form during processing or is initially introduced with the slurry constituents in soluble form, and which remains in the resultant insulation material. Additionally, by having an inherently porous structure, the finished insulation material is frequently susceptible to atmospheric sources of chloride penetration and contamination after being installed at the site of its intended use. Such atmospheric chloride contamination is particularly prevalent in coastal areas and in localities where substantial atmospheric contamination attends certain types of manufacturing operations.

By the term soluble chloride is meant chloride which when present in thermal insulation materials of the type herein described is capable of being dissolved in water or moisture entering into or contained in such insulation materials. The amount of soluble chloride in such insulation materials may be determined and measured by standard commercial testing procedures commonly utilized in the art. One such standard commercial testing procedure is subsequently discussed herein in greater particularity.

Quite commonly, the extent of soluble chloride in the insulation material, whether resulting from the slurry constituents or from atmospheric conditions or other external sources, is sufficient to cause extreme corrosion and rapid deterioration of metallic structural members on which the insulation material is applied or installed. In this respect, it has been found that stainless steel members in particular are readily subject to such corrosive action and deterioration and that such corrosive action is ordinarily intensified in those portions of the stainless steel members which are under stress. In the case of high-pressure conduits, reaction kettles, and associated high-pressure or high-temperature equipment, such as valves, fittings, and the like, the attendant possibility of complete rupture or failure of such equipment is particularly significant and dangerous.

Accordingly, extensive effort has been directed towards the elimination or substantial reduction of chloride-bearing constituents ordinarily used in the preparation of the insulation material by applicant and, although a substantial reduction in corrosion tendencies has been effected in this manner, it has been found that the complete elimination of soluble chloride from the materials used in the manufacture of such insulation materials is impractical as being too expensive and incapable of attainment in the production of a feasible relatively low-cost commercial insulation material. Additionally, the mere elimination of soluble chloride-bearing substances from the insulation forming constituents does not render satisfactory assurance that outside sources of soluble chloride contamination may not penetrate the insulation material and cause consequent subsequent corrosion after the insulation material has been installed and placed in use. Therefore, irrespective of the nature of the introduction of soluble chloride into the insulation material, it is extremely important and imperative to preclude the corrosive action resulting therefrom. Such preclusion of soluble chloride corrosion is effectively obtained by the present invention and forms one of the principal objectives thereof.

Another object of the present invention is to provide a molded or shaped thermal insulation material which will be capable of being utilized in conventional manner without necessitating extensive modifications in commonly-employed processing techniques, installation methods, or conventional uses of such insulation materials.

A further objective of the present invention is to provide a shaped high temperature alkaline earth metal silicate insulation material having effective corrosion inhibiting characteristics which are imparted to the insulation material in such manner as to render other characteristics of the insulation material substantially unaffected as a result thereof.

A still further objective of the present invention is to provided molded or shaped thermal insulation materials of light apparent density for use with structural members which are subject to corrosive chloride action, such insulation materials being both capable of providing effective insulation to such structural members and of protecting such structural members from corrosive chloride action.

A still further objective of the present invention is to provide an alkaline earth metal silicate insulation material which is particularly suitable for use with stainless steel installations, and which when utilized in such manner function both as a light-weight molded thermal insulation material and as a protective jacket of corrosion inhibiting material capable of effectively reducing chloride attack upon such installations, even from external sources such as are encountered in coastal areas and manufacturing locations having high atmospheric chloride concentrations.

Another particular objective of the present invention is the accomplishment of the foregoing objectives by the inclusion in an alkaline earth metal silicate insulating material of a "built-in" chloride corrosion inhibitor which is dispersed uniformly throughout the insulating material, and which is effective to inhibit chloride corrosion resulting both from exposure to atmospheric conditions and from such chloride as may be incorporated in the insulating material during the formation thereof.

Still another particular objective of the present invention is to provide an alkaline earth metal silicate thermal insulation material having appreciable amounts of sodium silicate dispersed throughout the insulation material during the formation thereof which functions to inhibit chloride caused stress-corrosion of stainless steel structural members when the insulation material is installed thereon.

Another particular objective of this invention is the provision of new and improved methods for accomplishing the foregoing objectives.

Other objects, as well as aspects and advantages of the present invention, together with the specific nature thereof, will become apparent from the following detailed description wherein, by way of example only, several preferred embodiments of the invention are described in specific detail.

In accordance with the general aspects of this invention, an alkaline earth metal silicate body of shaped thermal insulation material is prepared in which a uniformly distributed quantity of sodium silicate is dispersed throughout the insulation material in amounts ranging between about one percent and fifteen percent by weight of the insulation material and in such relative amounts that the sodium silicate constitutes, on a weight basis, at least fifty times the amount of soluble chloride present in the insulation material.

By maintaining a relative weight ratio of sodium silicate to soluble chlorides of at least about a fifty to one ratio, it has been found that such soluble chlorides as may be present in the insulation material are effectively inhibited to an extent sufficient to permit the use of alkaline earth metal silicate insulation materials in direct contact with metallic members, such as iron and steel, and particularly stainless steel, without the occurrence of damaging corrosion. Further, it has been found that, by the use of sodium silicate in such amounts in the insulation material, stressed stainless steel objects are capable of being effectively protected against damaging chloride corrosion even when situated in localities where excessive atmospheric concentrations of chloride contamination prevail.

In accordance with the procedures employed in the accomplishment of the foregoing objectives, an aqueous slurry is prepared utilizing slurry constituents suitable for the formation of an alkaline earth metal silicate insulation material and to which sodium silicate is added and dispersed throughout the slurry in amounts ranging between about one percent and fifteen percent either of the weight of the solid constituents in the slurry or by weight of the resultant insulation material. Additionally, the slurry constituents, including the aqueous medium, are selected to have a predetermined composite soluble chloride content which is sufficiently low that less than about one thousand parts per million soluble chloride will be added to the slurry or resultant insulation material. In any event, the composite soluble chloride should not exceed one-fiftieth the weight of sodium silicate added to the slurry. In other words, the preferable weight ratio of sodium silicate to soluble chloride should not be less than fifty to one.

One typical preferred example of a calcium-silicate insulation material prepared in accordance with the foregoing concepts which is particularly suitable for inhibiting chloride corrosion may be prepared in the following manner.

EXAMPLE 1

An aqueous slurry having a water to solids ratio of 6.0 is prepared on a relative weight basis by mixing, together with 1048 parts of water and 25.0 parts of spiculated asbestos fibers, such finely comminuted constituents and in the relative parts by weight (dry weight basis), as follows; quicklime — 46.0, quartz — 25.0, diatomaceous earth — 28.8, clay — 5.0, inert filler materials — 18.7 and a solution of sodium silicate. Numerous different types of suitable inert filler materials may be utilized and many representative types thereof are set forth in U.S. Pat. No. 3,001,882, which by mesne assignment is owned by the assignee of the present invention. The sodium silicate may be a solution of 82 parts by weight of $Na_2O.3.25SiO_2$ in 123 parts by weight of water.

The slurry as thus prepared is poured into an open or cavity-type mold and thereafter indurated in a steam autoclave operated at steam temperatures and pressures of approximately 208°C. and 250 p.s.i.g., respectively. The steam induration is continued for a sufficient length of time, ordinarily 4 – 6 hours, to convert the slurry into an indurated self-sustaining body of insulation material shaped to conform to the configuration and size of the mold in which it is contained during induration. Suitable methods of such induration are fully described in U.S. Pat. No. 2,547,127, issued to George L. Kalousek and, by mesne assignment, assigned to the assignee of this invention.

EXAMPLE 2

As another preferred example, a body of calcium-silicate thermal insulation material may be prepared in the same manner set forth in Example 1, above, with the exception that instead of introducing the sodium silicate as a solution, as in Example 1, the sodium silicate may be introduced into the slurry in finely divided solid or powdered form, preferably corresponding to a particle size such that by screen analysis 100 percent of the sodium silicate will pass through a 40 mesh screen and at least 75 percent will pass through a 100 mesh screen.

EXAMPLE 3

As a comparative standard for determining the effectiveness of sodium silicate as a corrosion inhibitor for soluble chloride, another body of calcium-silicate thermal insulation material was prepared in the same manner as described in Examples 1 and 2, above, except that the addition of sodium silicate was omitted from the processing of the material.

EXAMPLE 4

As an example of an alkaline earth metal silicate material containing soluble chloride in amounts wherein the weight ratio of sodium silicate to soluble chloride is substantially less than 50 to 1, another exemplary calcium-silicate thermal insulation material was also prepared from the same slurry formulation as Example 1, except that an excessive amount of chloride was purposely introduced into the slurry by the introduction into the slurry of 5% vinyl chloride coated glass fibers as a fibrous replacement for a like amount of asbestos fibers.

EXAMPLE 5

Another body of calcium silicate thermal insulation material was also prepared which corresponded to Example 1, with the exception that phenolic coated glass fibers in the amount of 5% by weight of the slurry solids were substituted for a like amount of asbestos fibers.

EXAMPLE 6

A body of alkaline earth metal silicate thermal insulation material also may be prepared corresponding to the indurated product of a slurry containing 98 parts water and 15.25 parts of asbestos fibers, together with the following parts by weight of finely comminuted solid materials (dry weight basis); quicklime — 28.07, quartz — 15.25, diatomaceous earth — 17.57, clay — 3.05, inert filler materials — 15.81, and powdered $Na_2O.3.25SiO_2$ — 5.0. In this example the slurry water was purposely selected to have a high soluble chloride content which would leave residual soluble chloride in the range of about 800 – 850 parts per million soluble chloride in the resultant product. The resultant slurry was indurated and molded in conventional fashion in a steam autoclave for 4 hours at a steam temperature and pressure of 208°C. and 250 p.s.i.g., respectively, in the same manner as described in the preceding examples.

As indicated in the following Example 7, the present invention is also suited to processing techniques involving filtration or compression molding, as well as in-situ molding.

EXAMPLE 7

An aqueous slurry having a water to solids weight ratio of 12 to 1 may be prepared by thoroughly mixing and dispersing with 1200 parts by weight of water; 76 parts by weight of finely divided diatomaceous earth, 9.5 parts by weight of finely divided quicklime, 9.5 parts by weight of spiculated asbestos fibers having an average length of about ½ to 1 inches, and 5 parts by weight of finely divided sodium silicate preferably having an average particle size, by screen analysis, smaller than 40 mesh and averaging between about 100 – 200 mesh in screen size. The slurry may thereafter be shaped and substantially dewatered to a self-supporting state in conventional filter-press molds operated at 50 pounds pressure. The processing, except for trimming operations, may then be completed by drying the shaped material to constant weight in a conventional drying lehr, or oven, to form a resultant insulation material having a density ranging between about 25–30 pounds per cubic foot.

As shown by the succeeding example, the advantages obtained by the present invention are not restricted to calciumsilicate types of thermal insulation materials, such as those exemplified above. Among other types of light weight porous silicate insulation materials through which water passes, a magnesium carbonate type of thermal insulation material having sodium silicate in amounts of about one percent to about fifteen percent, by weight, dispersed throughout the material may likewise be prepared and imparted with reduced chloride stress-corrosion properties in accordance with the concepts of this invention. For example, a body of thermal insulation material which may be prepared in accordance with the procedures and concepts of this invention is described in Example 8, following.

EXAMPLE 8

A slurry in the form of a magnesium hydroxide-water suspension is prepared by thoroughly mixing together 94.2 parts by weight of finely divided magnesium hydroxide with 2,032 parts by weight of water. The suspended magnesium hydroxide is then converted to crystalline magnesium carbonate trihydrate. A preferable manner of accomplishing such carbonate conversion is by bubbling gaseous carbon dioxide through the magnesium hydroxide and water suspension until substantially all of the magnesium hydroxide is converted to the crystalline carbonate. To the converted magnesium carbonate slurry there is added and uniformly dispersed in finely divided form 102 parts by weight of sodium silicate (powdered form) together with 1255 parts by weight of diatomaceous earth and 347 parts by weight of clay such as Bentonite clay or the like. To promote suspension and impart extra strength to the final product, there may also be added 193 parts by weight of asbestos fibers preferably of about ¼ to ½ inch in length. The slurry is then poured into conventional filter-press molds operated at a pressure of about fifty pounds pressure to remove excess water. The dewatered and molded residual filter-cake is thereafter dried in an oven, or by other suitable means, to constant weight.

In each of the foregoing Examples the sodium silicate may be introduced into the insulation material together with the other constituents during the initial slurry preparation. In the in-situ types of molding techniques the sodium silicate may be introduced into the slurry either as a finely comminuted solid, or as a solution, or as a proportionate amount of both solid and solution, depending primarily upon the particular slurry characteristics desired. In this respect, a wide variability in slurry consistencies and mixing characteristics may be achieved. Such variability is particularly desirable since it permits the attainment of the advantageous use of the concepts of this invention with the many different methods of preparation of shaped insulating materials, among which are the various methods previously exemplified. For example, it has been found that increased slurry viscosity and consistency attend the use of sodium silicate as a solution. Additionally, the use of sodium silicate as a solution tends to reduce surface friction of the slurry. On the other hand, the use of finely comminuted or powdered sodium silicate, particularly in the percentages herein contemplated, tends to leave the slurry properties substantially unaffected since the powdered sodium silicate remains substantially insoluble until the slurry is subjected to temperatures of about 212°F. Thus, substantial control and regulation of slurry properties and mixing characteristics can be achieved by suitable variation in the proportionate amounts of the sodium silicate introduced into the slurry as a solid or solution.

In the filtration types of processing the sodium silicate is preferably added to the initial slurry in finely comminuted solid or powdered form, as in the foregoing examples, in order to alleviate the amount of the sodium silicate which might be lost from the material during the dewatering or filtration stages of the processing. Although ordinarily less desirable, sodium silicate in solution form may be utilized in filtration-type processes by filtering a solution of sodium silicate through the dewatered filter cake as a part of the filtering process prior to drying the filter cake. By either method, however, the inclusion of one percent to fifteen percent sodium silicate in the resultant insulation material effectively inhibits the corrosion tendencies of the material which otherwise ordinarily results from the presence of soluble chloride in the material. Furthermore, it is of no consequence whether the presence of the soluble chloride occurs during processing or as a result of subsequent atmospheric contamination of the material, so long as the weight ratio of sodium silicate to soluble chloride is at least fifty to one.

The stress-corrosin effects of insulation materials containing soluble chloride, as well as the corrosion-inhibiting effects achieved by sodium silicate additions to such insulation materials, are clearly established by representative test data obtained from tests of insulation materials having formulations corresponding to Examples 1 – 8, above. Such tests also included the preparation of representative samples of insulation material corresponding to each of the foregoing examples, but having the sodium silicate omitted therefrom for purposes of determination of soluble chloride content of the insulation materials by conventional methods of quantitative analysis. The corrosion tests were carried out on stainless steel specimens since stainless steel has been found to be particularly susceptible to corrosion by insulation materials containing soluble chloride. The testing of the corrosion effects involved placing specimens of the insulation materials upon stressed U-shaped sixteen gauge stainless steel members in accordance with standard testing procedures, such as those described in the publications "Stress-Corrosion Cracking of Insulated Austenitic Stainless Steel," Dana, A. W., ASTM Bulletin, No. 225, 46–52 (1957) and "Stress-Corrosion Cracking Tests," Dana, A. W. and DeLong, W. B., Corrosion 12, No. 7, 309–310 (1956).

One conventional method for determining soluble chloride content was employed for determining the soluble chloride contents represented in Table A. Such method involves placing a 12.5 gram pulverized sample of the heat insulation material in a 250 ml. Erlenmeyer flask together with 125 ml. of freshly distilled water. The contents of the flask are then placed under a reflux condenser and refluxed for 4 hours. The refluxed contents of the flask are then vacuum-filtered, using a Buchner funnel, through a white ribbon filter paper. The resulting filtrate is then evaporated to dryness while being maintained in an alkaline condition as determined by the addition of methyl orange indicator. The dry residue is then digested in 25 ml. of distilled water on a hot plate and thereafter again filtered through white ribbon paper into a 100 ml. volumetric flask, with the residue and filter paper being washed thoroughly with hot distilled water. The resulting filtrate is then acidified with nitric acid and diluted with sufficient distilled water to make up a 100 ml. sample. Thereafter, aliquots of the sample are taken according to expected amounts of chlorides present in the sample. Ordinarily, a 25 ml. aliquot of the sample will suffice and to the aliquot there is added an equal volume of acetone. If smaller aliquots are taken, they may be diluted to 25 ml. with distilled water followed by an addition of 25 ml. of acetone. Then utilizing a magnetic stirrer and a micro-burette, the aliquot is titrated with an 0.002 normal solution of silver nitrate until a potentiometric end point of 245 millivolts is obtained using a silver electrode and a calomel electrode with an ammonium nitrate salt bridge. The amount of soluble chloride is determined in conventional manner upon the basis of the amount of silver nitrate used in the titration.

The comparative results of the soluble chloride analysis and the stainless steel stress-corrosion testing appear in Table A below.

TABLE A

| Example | Soluble Chloride (parts per million) | Stress Corrosion |
|---|---|---|
| 1 | 175 – 150 | none |
| 2 | 125 – 150 | none |
| 3 | 125 – 150 | Substantial stress corrosion |
| 4 | 3150 – 3200 | Extreme stress corrosion |
| 5 | 75 – 100 | none |
| 6 | 900 – 950 | none |
| 7 | 925 – 975 | none |
| 8 | 975 – 1025 | none |

From the results appearing in Table A, above, it is quite evident by comparison of the similar calcium silicate formulations of Examples 1 and 2, each of which contained equivalent amounts of sodium silicate amounting to approximately five percent (dry weight basis) of the slurry solids, and Example 3, which contained no sodium silicate in the formulation, that the addition of sodium silicate in the slurry effectively tends to inhibit stress-corrosion resulting from the presence of soluble chloride in the insulating material. Furthermore, the addition of five percent sodium silicate was ineffective to inhibit severe chloride stress-corrosion in Example 4 wherein the soluble chloride content was between three thousand one hundred and three thousand two hundred parts per million or the equivalent of a sodium silicate to soluble chloride weight ratio of between about 15.6 and 16.1 to 1, i.e., substantially less than the fifty to one minimum limitation of this invention. Even lesser amounts of soluble chloride in the insulation material are to be preferred however to provide a substantial excess of sodium silicate in the material which is capable of providing "built-in" protection against stress-corrosion attending the use of the insulation material in installations which are frequently subject to external sources of high chloride contamination.

Although it has been found that it is ordinarily preferable to restrict the soluble chloride content of materials to an amount which is substantially less than one thousand parts per million, and to employ the sodium silicate, either as a finely ground solid or as a solution, in amounts of about five percent by weight of the insulation, lesser or greater amounts of sodium silicate within the range of between about one percent and fifteen percent by weight of the insulation material may be utilized, depending upon the amount of soluble chloride which is to be inhibited. Obviously, where the raw materials, including the aqueous medium, are extremely free of soluble chloride and little, if any, atmospheric chloride contamination will be encountered during use of the insulation material, i.e., so that less than 200 part per million soluble chloride will be contained in the insulation material, a sodium silicate addition of one percent will ordinarily be satisfactory. In any event, however, the quantity of sodium silicate utilized should not exceed about 15 percent by weight of the insulation material, since it has been found that when greater amounts of sodium silicate are employed excessive shrinkage and warpage of the insulation material may occur during use of the insulation material at temperatures in excess of about 800°F.

It will, of course, be evident from the preceding detailed description, wherein, for purposes of explanation and not for purposes of limitation, several preferred embodiments have been shown and described, that resort may be made to numerous modifications without departing from the spirit of this invention, and it is, therefore, not the purpose herein to limit this invention otherwise than as may be necessitated by the scope of the appended claims.

I claim:

1. The method of making a structural insulation material which inhibits chloride ion stress corrosion of stainless steel and which has improved strength, comprising: preparing an aqueous slurry of an inert insulation filler, an alkaline earth metal oxide containing material from the group consisting of lime and magnesium hydroxide, and $SiO_2$ reactable with lime, said slurry having a water to solids ratio of at least 6:1 and a soluble chloride concentration of less than 1,000 ppm based on solids, forming a filter cake of the solids, filtering a solution of sodium silicate through the filter cake to impregnate the filter cake with an amount of sodium silicate to leave a weight ratio of sodium silicate to soluble chloride of at least 50 to one after hardening of the binder, causing the alkaline earth containing material to harden into a strong crystalline binder having from 1% to 15% by weight of said soluble sodium silicate dispersed throughout the insulation material, and drying the shaped body so produced.

2. The method of claim 1 wherein the alkaline earth metal oxide containing material is lime.

3. The method of claim 1 wherein the slurry contains asbestos and magnesium hydroxide.

4. The method of claim 3 including the step of carbonating the magnesium hydroxide prior to drying.

5. The method of making a strong porous light weight shaped body which inhibits chloride ion stress corrosion of stainless steel and which has the strength of a structural insulation, comprising: preparing an aqueous slurry of an inert insulation filler, an alkaline earth metal oxide containing material from the group consisting of lime and magnesium hydroxide, and $SiO_2$ reactable with lime, said slurry having less than 1,000 ppm of soluble chloride based on the solids, mixing solid sodium silicate with the slurry while controlling the temperature and time of contact to give from 1% to approximately 15% by weight of solid sodium silicate in the slurry, shaping the solids of the slurry while retaining the solid sodium silicate therein, and causing the alkaline earth containing material to harden into a strong crystalline binder to provide a resultant insulation material having sodium silicate present in an amount at least 50 times the chloride ion.

* * * * *